UNITED STATES PATENT OFFICE.

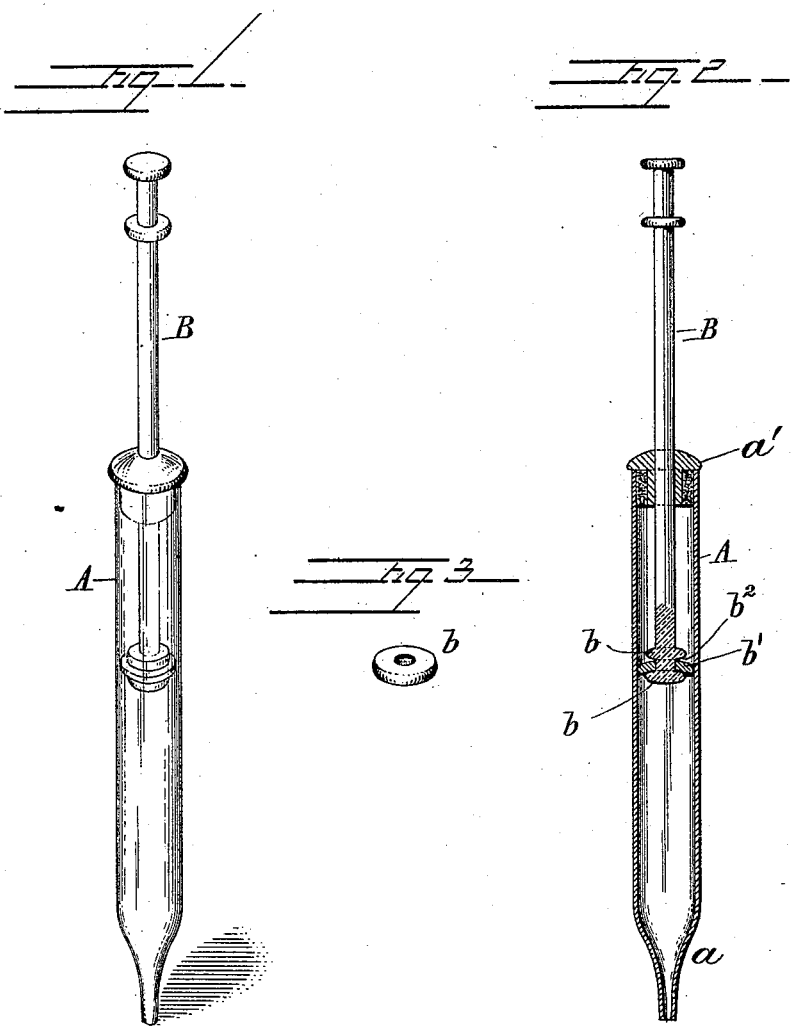

HENRY J. MARIS, OF PHILADELPHIA, PENNSYLVANIA.

SYRINGE.

SPECIFICATION forming part of Letters Patent No. 470,811, dated March 15, 1892.

Application filed August 23, 1890. Serial No. 362,864. (No model.)

*To all whom it may concern:*

Be it known that I, HENRY J. MARIS, a citizen of the United States, residing at the city and county of Philadelphia, and State of Pennsylvania, have invented certain new and useful Improvements in Syringes, of which the following is a full, clear, and exact description, reference being had to the accompanying drawings, of which—

Figure 1 is a perspective view of a syringe embodying my invention. Fig. 2 is a central vertical section. Fig. 3 is a separate view of the packing-washer.

The nature of this invention is a syringe whose piston-packing is composed of a rubber disk or washer which is secured to the operating rod or stem in a novel manner, whereby certain advantages are gained, as hereinafter described and claimed. Such packings have heretofore been made with leather washers or with cotton; but as these substances are absorbents they become very soft and yielding in practice, and they are thus rendered inferior in action. Besides, the leather washers are too expensive for general use. Rubber washers have been used; but they were not large enough and thin enough to project beyond the edges of the piston-groove and assume readily a concavo-convex form whenever the piston moved.

The object of my invention is to obviate these defects in syringe-piston packings, and this end I accomplish by means of the construction shown in the annexed drawings, to which reference will now be had.

A represents the syringe receiver or reservoir, which is usually a glass cylinder provided with an integral nozzle $a$ on its lower end and with a detachable perforated head or plug $a'$ in its upper end. Through this plug or head extends the operating rod or stem B, which has formed on its inner end the circumferentially-grooved piston $b$.

$b'$ is the piston-packing. It is composed of a rubber washer of slightly greater diameter than the bore of the cylinder, which washer is expanded and then sprung into the groove $b^2$ in the piston. The packing is thus effectually secured in place without the use of cement or other like medium. The sides of the groove $b^2$ are beveled or inclined, as seen, so that when the rod is being retracted the packing will assume the curved or concavo-convex condition shown in Fig. 2, and when the rod is being projected said packing will assume a reverse condition. The packing, being elastic, will thus closely hug the periphery of the cylinder and adapt itself to any inequalities in the latter. This packing is free from the defects incident to the prior constructions. It is cheap in manufacture and is at all times positive in its action.

Having thus described my invention, I claim as new and wish to secure by Letters Patent—

In a syringe, the combination of the receiver or reservoir, the piston provided with the beveled-edge groove, and the thin disk washer supported in said groove and extended quite a distance beyond the edges thereof, substantially as specified.

In testimony whereof I have hereunto affixed my signature this 27th day of May, A. D. 1890.

HENRY J. MARIS.

Witnesses:
 FRANCIS S. BROWN,
 HARRY B. COURTER.